(12) United States Patent
Cohen et al.

(10) Patent No.: US 7,062,764 B2
(45) Date of Patent: Jun. 13, 2006

(54) SYSTEM AND METHOD FOR MANIPULATING OFFLINE SOFTWARE

(75) Inventors: Jason Cohen, Seatac, WA (US); Ryan Burkhardt, Redmond, WA (US); Tom Yaryan, Seattle, WA (US); Seetharaman Harikrishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 754 days.

(21) Appl. No.: 10/173,216

(22) Filed: Jun. 17, 2002

(65) Prior Publication Data

US 2003/0233644 A1 Dec. 18, 2003

(51) Int. Cl.
*G06F 9/44* (2006.01)
*G06F 15/177* (2006.01)

(52) U.S. Cl. ...................... 717/171; 709/221
(58) Field of Classification Search ........ 717/168–178; 709/221, 220–222
See application file for complete search history.

(56) References Cited

U.S. PATENT DOCUMENTS

| | | | |
|---|---|---|---|
| 5,142,680 A | 8/1992 | Ottman et al. | |
| 5,469,573 A * | 11/1995 | McGill et al. | 717/127 |
| 5,537,548 A | 7/1996 | Fin et al. | |
| 5,539,730 A | 7/1996 | Dent | |
| 5,555,416 A | 9/1996 | Owens et al. | |
| 5,684,996 A | 11/1997 | Westerholm et al. | |
| 5,713,024 A | 1/1998 | Halladay | |
| 5,794,052 A * | 8/1998 | Harding | 717/178 |
| 5,838,916 A * | 11/1998 | Domenikos et al. | 709/219 |
| 5,927,050 A | 7/1999 | Houck et al. | |
| 5,996,074 A | 11/1999 | Houck et al. | |
| 6,006,034 A * | 12/1999 | Heath et al. | 717/170 |
| 6,016,400 A | 1/2000 | Day et al. | |
| 6,080,207 A | 6/2000 | Kroening et al. | |
| 6,094,720 A | 7/2000 | Cromer et al. | |
| 6,110,228 A * | 8/2000 | Albright et al. | 717/178 |
| 6,138,179 A | 10/2000 | Chrabaszcz et al. | |
| 6,188,779 B1 | 2/2001 | Baum | |
| 6,199,203 B1 | 3/2001 | Saboff | |
| 6,247,128 B1 | 6/2001 | Fisher et al. | |
| 6,256,732 B1 | 7/2001 | Cromer et al. | |
| 6,260,160 B1 * | 7/2001 | Beyda et al. | 714/27 |
| 6,262,726 B1 | 7/2001 | Stedman et al. | |
| 6,282,711 B1 | 8/2001 | Halpern et al. | |
| 6,286,138 B1 * | 9/2001 | Purcell | 717/143 |
| 6,321,219 B1 | 11/2001 | Gainer et al. | |
| 6,374,401 B1 | 4/2002 | Curtis | |
| 6,377,958 B1 | 4/2002 | Orcutt | |
| 6,385,766 B1 | 5/2002 | Doran, Jr. et al. | |
| 6,453,413 B1 | 9/2002 | Chen et al. | |
| 6,512,526 B1 | 1/2003 | McGlothlin et al. | |
| 6,532,474 B1 | 3/2003 | Iwamoto et al. | |
| 6,598,223 B1 | 7/2003 | Vrhel, Jr. et al. | |

(Continued)

OTHER PUBLICATIONS

Computertips.com, "Browsing Offline", 1997, Florida Holiday Connection Inc.*

(Continued)

*Primary Examiner*—Kakali Chaki
*Assistant Examiner*—Trenton J. Roche
(74) *Attorney, Agent, or Firm*—Senniger Powers (57) ABSTRACT

A system and method for manipulation of offline software. A software driver executing on a computer accesses and modifies target software while the target software is in an offline state. The software driver allows installation and configuration of an operating system and/or associated application programs to the target software when an operating system associated with the target software is not executing.

38 Claims, 5 Drawing Sheets

U.S. PATENT DOCUMENTS

| | | | |
|---|---|---|---|
| 6,681,323 | B1 | 1/2004 | Fontanesi et al. |
| 6,711,624 | B1 | 3/2004 | Narurkar et al. |
| 2002/0013939 | A1 | 1/2002 | Daynes et al. |
| 2002/0016956 | A1 | 2/2002 | Fawcett |
| 2002/0019887 | A1 | 2/2002 | Moore |
| 2002/0120725 | A1* | 8/2002 | DaCosta et al. ............ 709/221 |
| 2002/0156877 | A1* | 10/2002 | Lu et al. ..................... 709/221 |
| 2002/0174329 | A1 | 11/2002 | Bowler et al. |
| 2002/0188941 | A1 | 12/2002 | Cicciarelli et al. |
| 2002/0194398 | A1 | 12/2002 | Bentley et al. |
| 2003/0233379 | A1 | 12/2003 | Cohen et al. |
| 2004/0070678 | A1 | 4/2004 | Toyama et al. |
| 2004/0218902 | A1 | 11/2004 | Yanagita |

OTHER PUBLICATIONS

Wikipedia, "History of Internet Explorer".*

Zhang et al., "A Modeling Perspective of Image-Based Installation," Dell White Paper, pp. 1-13, Mar. 2002, U.S.A.

White Paper, "Microsoft Windows 2000 Server—Remote Operating System Installation," Microsoft Corporation, pp. i-iv, 1-41, 1999, U.S.A.

Yang, "Creating the Standard Desktop Environment in a Non-Standard World," Proceedings of the 29th Annual Conference on University and College Computing Services, 2001, pp. 215-218, vol. 29, ACM Press, New York, U.S.A.

Howland, "Managing Computer Science Laboratories Using Open Software," Proceedings of the Seventh Annual Consortium for Computing in Small Colleges Central Plains Conference on the Journal of Computing in Small Colleges, 2001, pp. 117-126, The Consortium for Computing in Small Colleges, U.S.A.

Hutchinson et al., "Logical vs. Physical File System Backup," Proceedings of the Third Symposium on Operating Systems Design and Implementation, 1999, pp. 239-249, USENIX Association, California U.S.A.

Dubose, "Manage All the Computer Labs on Campus? What Did I Do To Deserve This?" Proceedings of the 28th Annual Conference on User Services: Building the Future, 2000, pp. 74-78, ACM Press, New York, U.S.A.

Kunz et al., "The ISU Micronet Scout," Proceedings of the 25th SIGUCCS Conference on User Services: Are You Ready?, 1997, pp. 185-195, ACM Press, New York, U.S.A.

* cited by examiner

SYSTEM AND METHOD FOR MANIPULATING OFFLINE SOFTWARE

TECHNICAL FIELD

The present invention relates to the field of software manipulation. In particular, this invention relates to a system and method for manipulation by a computer of offline target software stored on one or more target computer-readable media of a target computer.

BACKGROUND OF THE INVENTION

In some prior art systems, installing and configuring desirable features of a software product is complex and requires a significant length of time. In such systems, customizing an operating system and its installed applications can only be done by running that operating system and performing actions while in that context. Such online system manipulation actions include installing or uninstalling applications, customizing settings such as desktop wallpaper, or adding a new user. Booting into the operating system to make these changes is a time consuming process and requires validation of those changes thereby delaying deployment of the operating system. In addition, updating files or system settings for software that is actively executing may result in the software becoming inconsistent or unstable. Further, reboots may be required between updates.

In addition, the prior art systems fail to support scenarios in which an operating system requires certain changes prior to booting. For example, the operating system may require a certain device driver. In such cases, the prior art systems perform the changes after the operating system boots.

For these reasons, a system for offline system manipulation is desired to address one or more of these and other disadvantages.

SUMMARY OF THE INVENTION

The invention provides software for manipulation by a computer of offline target software stored on one or more target computer-readable media of a target computer. In particular, the invention includes a driver executing on the computer to provide access to the offline target software.

The invention includes software functionality that allows installation and configuration of an operating system and/or associated application programs offline or otherwise outside the context of the operating system associated with the target software. That is, the invention includes a software installation and configuration technique performed without installing or traditionally running the target software or an operating system associated with the target software.

With the architecture of the invention, installation and configuration actions, data store manipulation, execution of application programming interface routines, file system manipulation, and other actions can be applied to an operating system and application programs while the operating system and application programs are in an offline state. Software of the invention redirects such actions performed in an online manner to the location of the files associated with the offline system. In addition, if a list of the actions is declared or otherwise available to the invention software, the invention software provides for performance of the actions natively (i.e., without redirection). The architecture of the invention can be used in both an online and offline manner to act on the operating system and application programs of the running system or on a set of files at another location, respectively.

With the invention, the user can modify software on one or more target computers without booting into an operating system associated with the software. In addition, changes can be made to the software without re-validating the software in its entirety or otherwise re-packaging the software.

In accordance with one aspect of the invention, a system provides manipulation of target software by a computer. The target software is stored on one or more target computer-readable media. The target software has an online state and an offline state. The system executes a driver on the computer to provide access to the target software. The driver includes one or more redirect components for manipulating the target software when the target software is offline. The manipulation occurs in response to at least one command received from a user.

In accordance with another aspect of the invention, a method provides manipulation of target software by a computer. The target software is stored on one or more target computer-readable media. The target software has an online state and an offline state. The method further includes accessing the target computer-readable media when the target software is offline in response to at least one command received from a user.

In accordance with another aspect of the invention, a computer-readable medium includes a data structure. The data structure represents a queue and is for use by a computer in manipulating target software stored on one or more target computer-readable media. The target software has an online state and an offline state. The manipulation occurs when the target software is in the offline state and in response to at least one command received from a user. Further, the data structure includes a queue field that stores a list of one or more tasks associated with the executable command.

In accordance with yet another aspect of the invention, a system adds one or more drivers to one or more target computer-readable media. The system performs the addition via a computer. The target software has an online state and an offline state. The system includes a user interface associated with the computer and adapted for creating a system preparation file. The system preparation file includes a list of the drivers to be added to the target software responsive to user input. The system further includes a software tool that executes on the computer. The software tool is responsive to the user interface and installs the drivers listed in the system preparation file to the target software when the target software is in the offline state.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
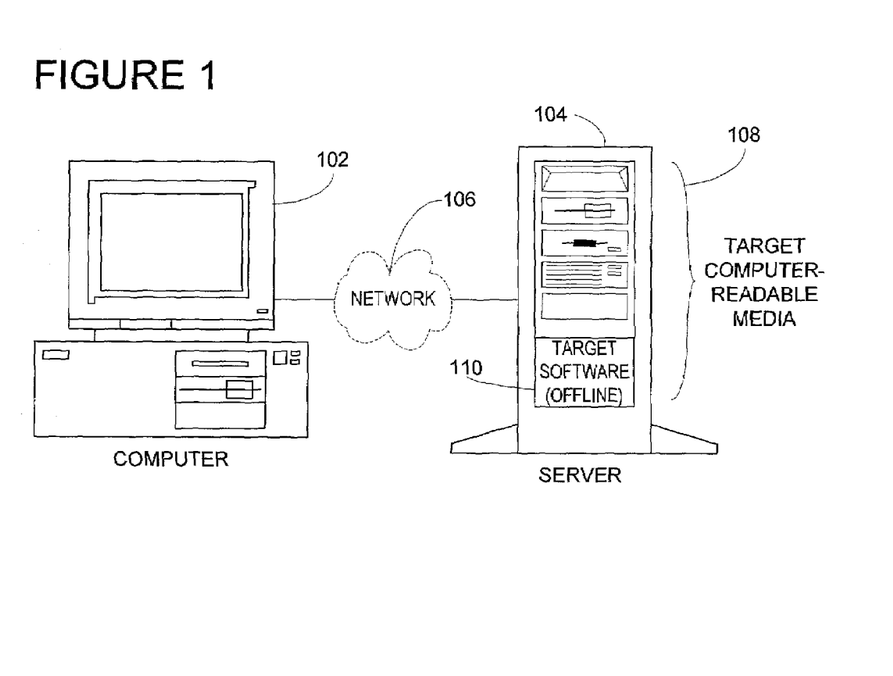
FIG. 1 is an exemplary block diagram illustrating a computer connected to a target computer-readable media.

The invention provides software for manipulation of offline target software in a scenario such as illustrated in FIG. 1. In particular, the invention software allows for manipulation by a computer of target software stored on one or more target computer-readable media when an operating system associated with the target software is not executing or is otherwise offline. Executing an operating system or an application program includes loading the machine code of the operating system or the application program into memory and then performing instructions in accordance with the machine code. In one embodiment, a server stores one or more images of target software that are offline. The target software has an online state and an offline state corresponding to the states of an operating system associated with the target software in which the operating system is running and not running, respectively. That is, the offline manipulation of the invention relates to manipulating the target software when an operating system associated with the target software is not running or executing. The online state and the offline state tend to be mutually exclusive. If the target software includes an operating system, the target software is online when the operating system is executing and offline when the operating system is not executing. If the target software includes an application program, the target software is online when the application program is executing and offline when the application program is not executing. Further examples of manipulation of offline software are described with respect to FIG. 1 below.

The system of the invention includes a driver executing on the computer to provide access to the target software (e.g., via the data communication system). The driver includes one or more redirect components for manipulating the target software when the target software is offline. The manipulating occurs in response to at least one command received from a user. Manipulation includes, but is not limited to, modifying files by adding, deleting, or editing files or system settings (e.g., registry keys).

The invention differs from other systems in various ways. For example, other systems provide for redirecting application programming interface calls in a virtual memory system. Similarly, other systems include computer systems that automatically provide some of their capabilities to a main computer without powering on to facilitate configuring such systems in their shipping packages. However, all the other systems execute the operating system associated with the target software. In contrast, the invention provides a system for manipulation of software without executing an operating system associated with the software as illustrated in FIG. 1.

The invention software facilitates the user selection of configuration options prior to installing a complete software image or other representation or state of a file or file system. The result is a fast installation and configuration of a software product with the desired features in a minimal amount of time. In addition, with the invention software, any online action can be redirected to be performed in an offline manner. Such actions include, but are not limited to, adding services (to the operating system and to any application programs), adding patches or fixes to software, adding hardware support (e.g., drivers), adding or removing functionality or entire application programs. Further, additional components can be added to offline images such as SKU and language components.

In one embodiment, re-direction is not specified for an action. For example, a software component may specify that an action is to be performed in the context of the installed, executing operating system to which the software component will be added. In such an embodiment, a manifest for the software component (e.g., service, patch, or application program) provides information relating to the action. Offline updates are performed to allow for the action to be performed when the operating system is installed and executing (i.e., performed in an online manner).

The functionality illustrated in FIGS. 1–6 may be accessed by the user via a graphical user interface such as user interface 602.

Referring first to FIG. 1, an exemplary block diagram illustrates a computer 102 connected to a server 104. The server 104 includes one or more target computer-readable media 108 storing target software 110 that is offline. By way of example and not limitation, computer-readable media comprise computer storage media and communication media as described with reference to FIG. 7. In operation, the computer 102 responds to commands received from a user and manipulates the target software 110 stored on the server 104.

In one embodiment, the computer 102 and server 104 (or the target software 110) are connected via a data communication system such as network 106. The data communication system includes, but is not limited to, networked connections as well as direct connections such as serial, parallel, infrared, cellular, or other wired or wireless connection, or any other network such as described with reference to FIG. 7. For example, an operating system associated with the computer 102 is executing while the server 104 such as a file server simply provides access to the target software 110. The target software 110 may include an installed operating system. The operating system included or otherwise associated with the target software 110 is not executing. The computer 102 accesses the target computer-readable media 108 storing the target software 110 to make modifications to the target software 110 that is offline. The target computer-readable media 108 can be accessed by the computer 102 as a network share or as a local medium.

Those skilled in the art will note that the illustration of FIG. 1 including the network 106 is merely exemplary. In another embodiment, the target computer-readable media 108 is locally accessible by the computer 102. That is, network 106 and server 104 are not included in that the target software 110 is not physically on another computer attached via a network or other connection. The target software 110 can be another volume, a logical set of folders, or an image on the computer 102. In this embodiment, an operating system associated with the target software 110 is not currently active or running in the context of the operating system associated with the computer 102. For example, the computer 102 may be the same computer used to install the operating system of the target software 102 to the target computer-readable media 108. In this example, the computer 102 halts execution of the installed operating system of the target software 110 and boots another operating system (e.g., via a removable computer-readable medium). The computer 102 boots the other operating system or some environment, separate from the target software 110, which executes with the invention software to manipulate the offline target software 110. For example, the computer 102 may boot off a floppy or a CD-ROM. In the context of this booted operating system, a user could modify the target software 110 stored on local computer-readable medium such as the C:\drive. Such modification occurs offline in that the computer 102 is booted, but not into an operating system associated with the target software 110. For example, the invention software allows complex modifications to occur in this offline fashion by re-directing all tasks associated with the installation of an application program to the offline target software 110. After re-directing performance of the tasks and after a reboot into the operating system associated with the target software 110, the application program has been installed.

Generally, the invention provides software (such as driver software 304 in FIG. 3) to access the data on the target computer-readable medium 108. In one scenario of the invention as described above, the user locally boots from a bootable removable media to modify local, offline software. In another scenario of the invention, the user boots a local system to modify remote, offline software. In one embodiment, the invention software mounts the target computer-readable medium 108 using mounting methods known in the art to provide basic file input/output access. For example, an image foo.img can be mounted and appear to the online system as X:\ (i.e., X:\system, X:\config, etc.). The invention also provides software routines to modify system settings associated with the target computer 110. In one embodiment, the invention provides an application programming interface to allow a user to modify such system settings (e.g., registry values). For example, an API of the invention allows a user to load a registry hive associated with the target software 110 in the computer 102. Using the API, the user can modify the loaded registry hive to effect changes in the target software 110. For example, the following registry key illustrates a registry hive loaded from offline software such as target software 110 into the computer 102.

HKLM\offline_system\setup\Setupinprogress=1

Figure 3:
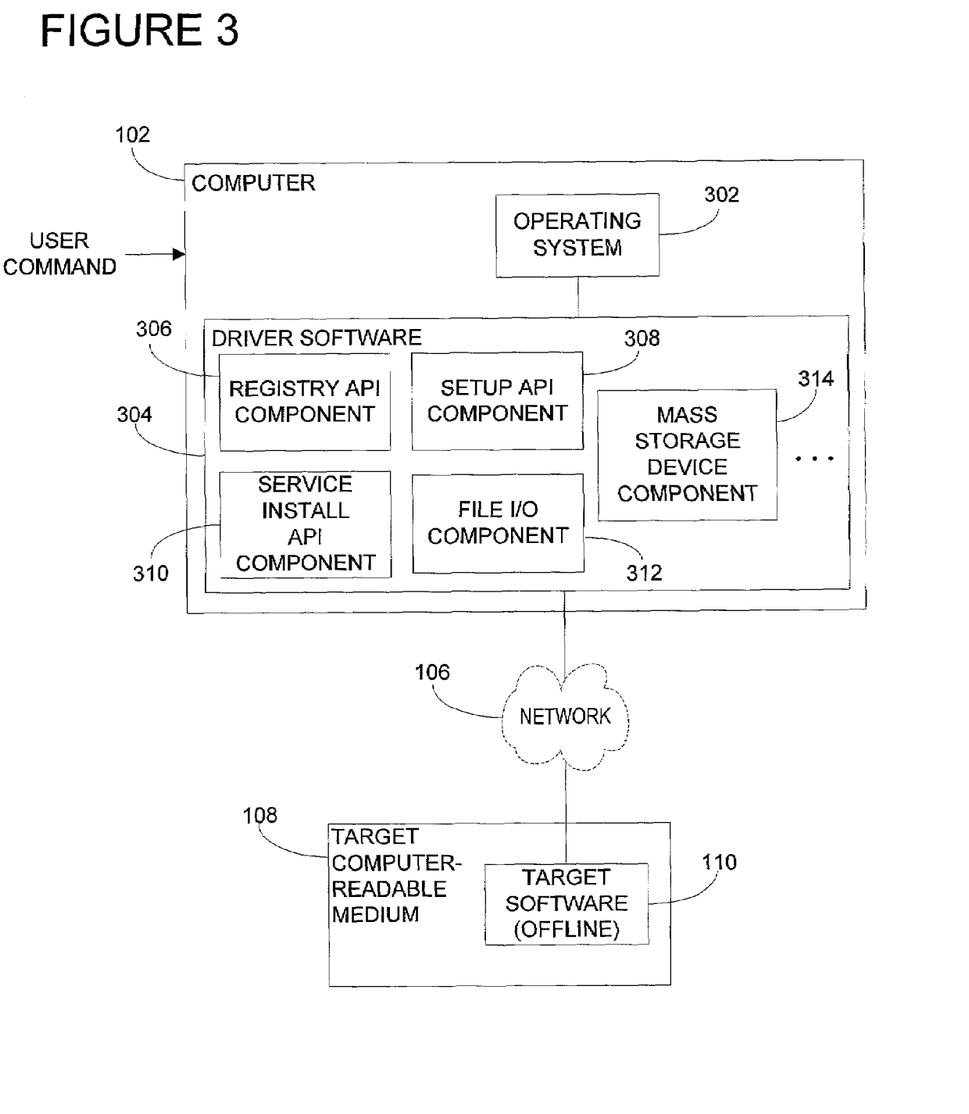
FIG. 3 is an exemplary block diagram illustrating the driver software components of the computer communicating with target software.

After loading the registry hive, the loaded registry hive points to the mounted, offline software image. As in the previous example, the offline registry hive points to the image foo.img at X:\ (i.e., X:\system, X:\config, etc.). All registry key updates are directed to the loaded, offline registry hive. In an alternative embodiment, all the registry key updates that occur during modification of the offline file system are queued and then applied after the modifications to the offline file system are complete.

Figure 2:
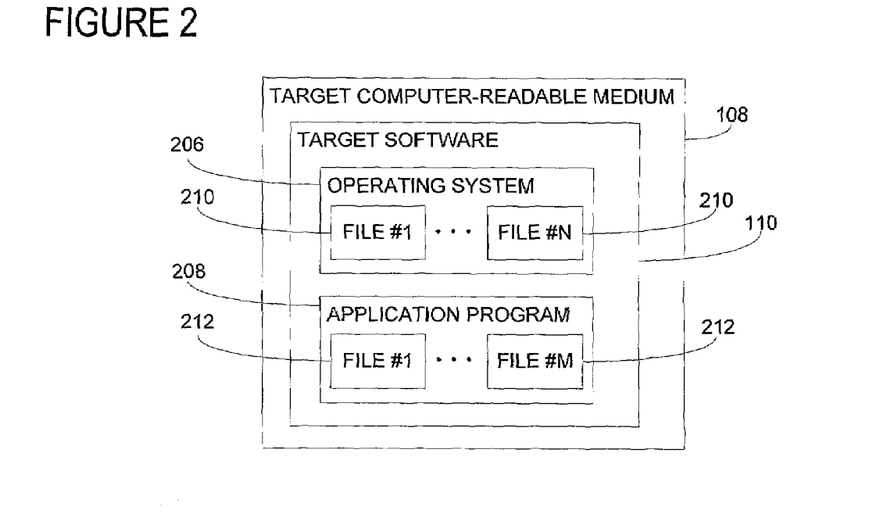
FIG. 2 is an exemplary block diagram illustrating a target computer-readable medium storing target software.

Referring next to FIG. 2, an exemplary block diagram illustrates the target computer-readable medium 108 that stores target software 110. The target software 110 includes an operating system 206 and/or an application program 208. The operation system 206 includes one or more operating system files 210 such as file #1 through file #N. The application program 208 includes one or more application program files 212 such as file #1 through file #M.

Referring next to FIG. 3, an exemplary block diagram illustrates the driver software components of the computer 102 that communicate with the target software 110 stored on the target computer-readable media 108. In this example, the computer 102 includes an online operating system 302 and driver software 304. While the computer 102 is shown connected to the target computer-readable media 108 via network 106, such a connection is optional as described above.

The driver software 304 includes components that can be executed when the computer 102 receives a command from the user. In one embodiment, driver software 304 includes a registry application programming interface (API) component 306, a setup API component 308, a service install API component 310, a file input and output (I/O) component 312, and a mass storage device component 314. The registry API component 306 updates one or more system settings on the for the target software 110 by modifying one or more files (e.g., a registry) on the target computer-readable media 108. The setup API component 308 configures the next boot state of the target software 110 (e.g., out of box, first boot, or audit boot) and configures setup configuration options such as the install directory. The service install API component 310 adds or removes a service to or from the target software 110 by installing one or more files associated with the service to the target computer-readable media 108. The file I/O component 312 performs file input and file output operations on the target computer-readable media 108. The mass storage device component 314 adds at least one device driver for a mass storage device controller to the target software 110 by installing one or more files associated with the device driver to the target computer-readable media 108. In addition, the components of the driver software 304 may configure system settings (e.g., registry keys) for the target software 110 via the registry API component 306. The components of the driver software 304 operate on the offline target software 110.

Those skilled in the art will appreciate that the driver software 304 may include other components not specifically described herein that allow the computer 102 to manipulate the target software 110 while the target software 110 is offline. It is contemplated by the inventors that such alternate embodiments of the driver software 304 are within the scope of the invention. For example, the mass storage device component 314 is one example of a device component installing a device driver, but other device components installing other device drivers, hardware or software, are contemplated by the inventors to be within the scope of the invention.

Figure 4:
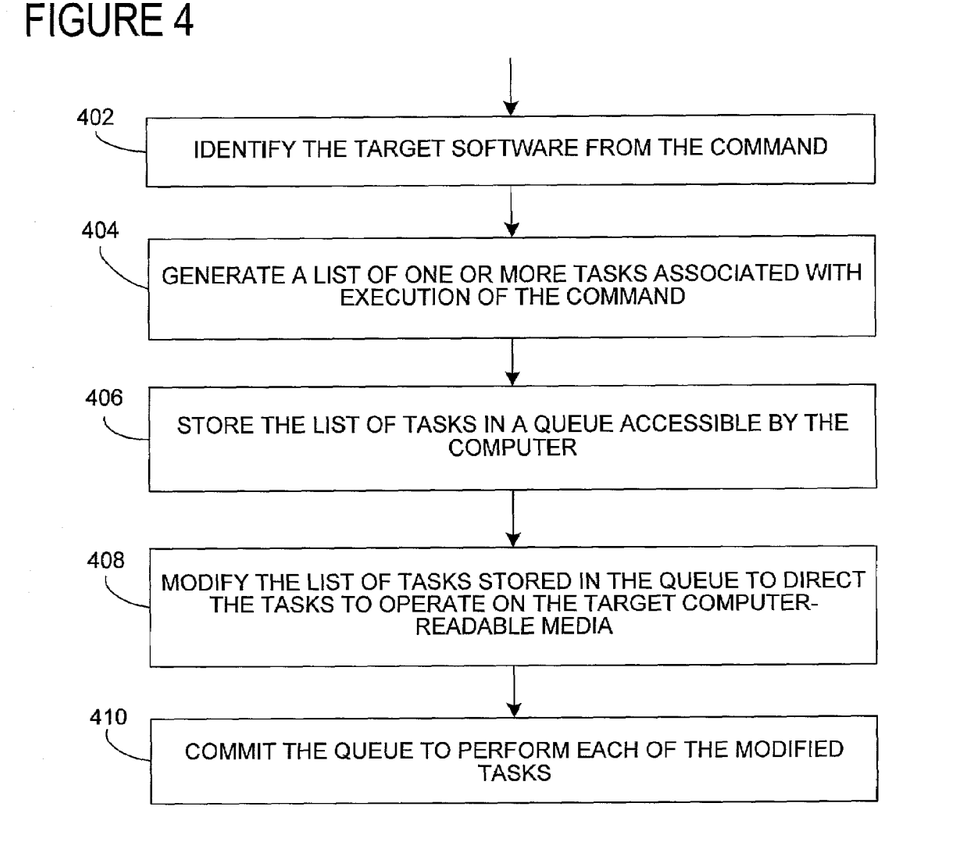
FIG. 4 is an exemplary flow chart illustrating operation of the driver software components.

Referring next to FIG. 4, an exemplary flow chart illustrates the operation of the driver software 304 components. At step 402, the target software 110 is identified from a command received from a user. A list of one or more tasks associated with execution of the command is generated at step 404. Generating a list of one or more tasks associated with the execution of a command occurs dynamically, or on-the-fly, in that the tasks are not hard-coded into the driver components. The driver components dynamically generate the list of tasks to be performed and store the list in a queue. At step 406, the list of one or more tasks is stored in a queue accessible by the computer 102. The list of one or more tasks stored in the queue are modified at step 408 such that the tasks are directed to operate on the target computer-readable media 108. That is, the list is modified such that an operating system of the computer 102 such as operating system 302 will execute the listed tasks to manipulate or otherwise operate on the target software 110. The driver components edit the list of tasks stored in the queue to point to the offline image loaded in the online system. For example, the driver component may edit a string in the list of tasks from "D:\i386\System32" to "C:\opsysdir\System32." At step 410, the queue is committed to perform each of the modified tasks. Alternatively, the computer 102 may generate, store, and modify the tasks while the target software 110 is online and then commit the queue to perform the tasks when the target software 110 is offline.

Figure 5:
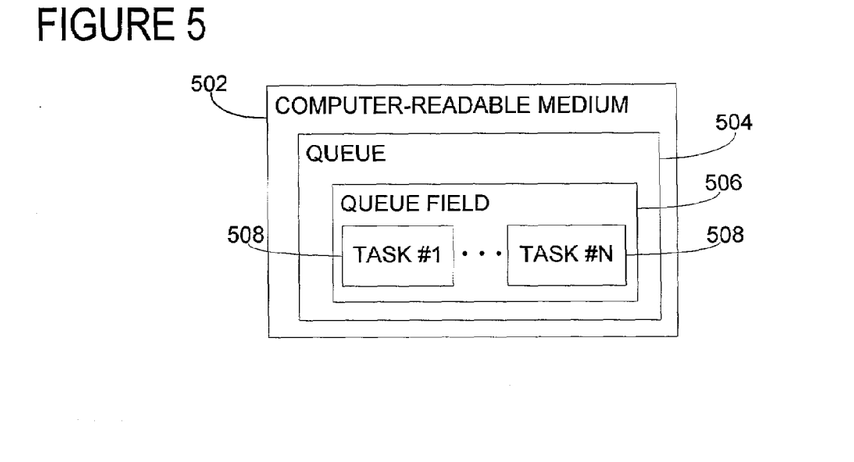
FIG. 5 is a block diagram illustrating an exemplary computer-readable medium storing a queue.

Referring now to FIG. 5, a block diagram illustrates an exemplary computer-readable medium 502 storing a queue 504. In this instance, the queue 504 is a data structure that can be used by the computer 102 to manipulate the target software 110 stored on the target computer-readable media 108. The queue 504 has a queue field 506 that stores a list of one or more tasks 508 such as task #1 through task #N that are associated with execution of a command received from a user.

In one embodiment, the computer 102 modifies the list of tasks 508 stored in the queue field 506 to direct the tasks 508 to operate on the target computer-readable media 108. Further, the computer 102 commits the queue to perform each of the modified tasks 508 stored in the queue field.

Figure 6:
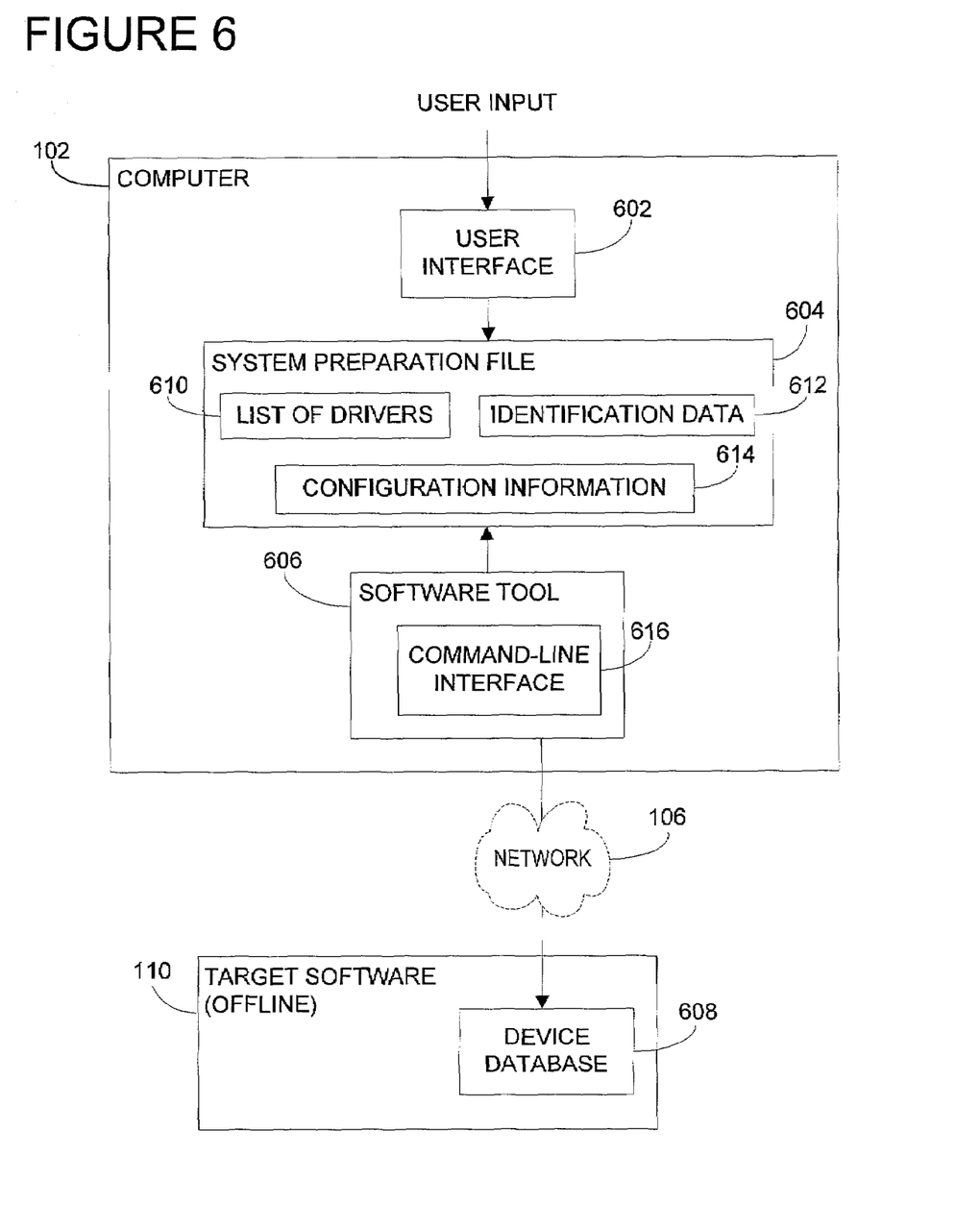
FIG. 6 is a block diagram illustrating the exemplary elements of software for manipulation of offline mass storage device drivers.

Referring next to FIG. 6, a block diagram illustrates the exemplary elements of software for offline manipulation of mass storage device drivers. As described above, the computer 102 is connected to the target software 110 via network 106. In this example, the computer 102 includes user interface 602, a system preparation file 604, and a software tool 606. The target software 110 includes a device database 608. The device database 608 stores mass storage device drivers. While the computer 102 is shown connected to the target software 110 via network 106, such a connection is optional as described above.

The user interface 602 is, for example, a graphical user interface (GUI) that allows the user to create the system preparation file 604. In this instance, the system preparation file 604 includes a list of drivers 610 to be added to the target software 110 in response to the input received from the user, identification data 612 for each of the drivers, and configuration information 614 for each of the drivers. For example, the list of drivers 610 may include a text-based description of each driver. In addition, the identification data 612 may include a unique identifier corresponding to each driver. Further, the configuration information 614 may specify parameters for use when installing each driver.

The software tool 606 executes executable instructions on the computer 102 in response to input received by the user interface 602. The software tool 606 includes a command-line interface 616 for parsing command-line options received via the user interface 602. In one embodiment, the command-line options identify the system preparation file 604 (e.g., via a path), the target computer-readable medium 108 (e.g., via a path), and/or the target software 110. The execution of the executable instructions by software tool 606 and the command-line interface 616 allows manipulation of the target software 110. By way of example, and not limitation, the manipulation of the target software 110 includes: installing the list of drivers 610 to the target software 110, enabling the drivers by adding the identification data 612 from the system preparation file 604 to the device database 608, configuring the drivers according to the configuration information 614, and updating one or more system settings for the server 104 as needed by the installed drivers.

In an alternative embodiment, the invention software is operable in an offline fashion with images or target software 110 that have not been fully applied, installed, or otherwise integrated. For example, the invention software can modify application programs that have been pre-installed or staged. Similarly, a software patch can be applied to an offline image prior to the first out of the box experience by the user. In a further example, an original equipment manufacturer (OEM) can add a driver that is necessary for booting from an offline image that includes an operating system. The offline image can then boot after the OEM adds the necessary driver. In another example, an OEM can add a service pack or other patch to numerous offline images that have not yet been applied or integrated.

Figure 7:
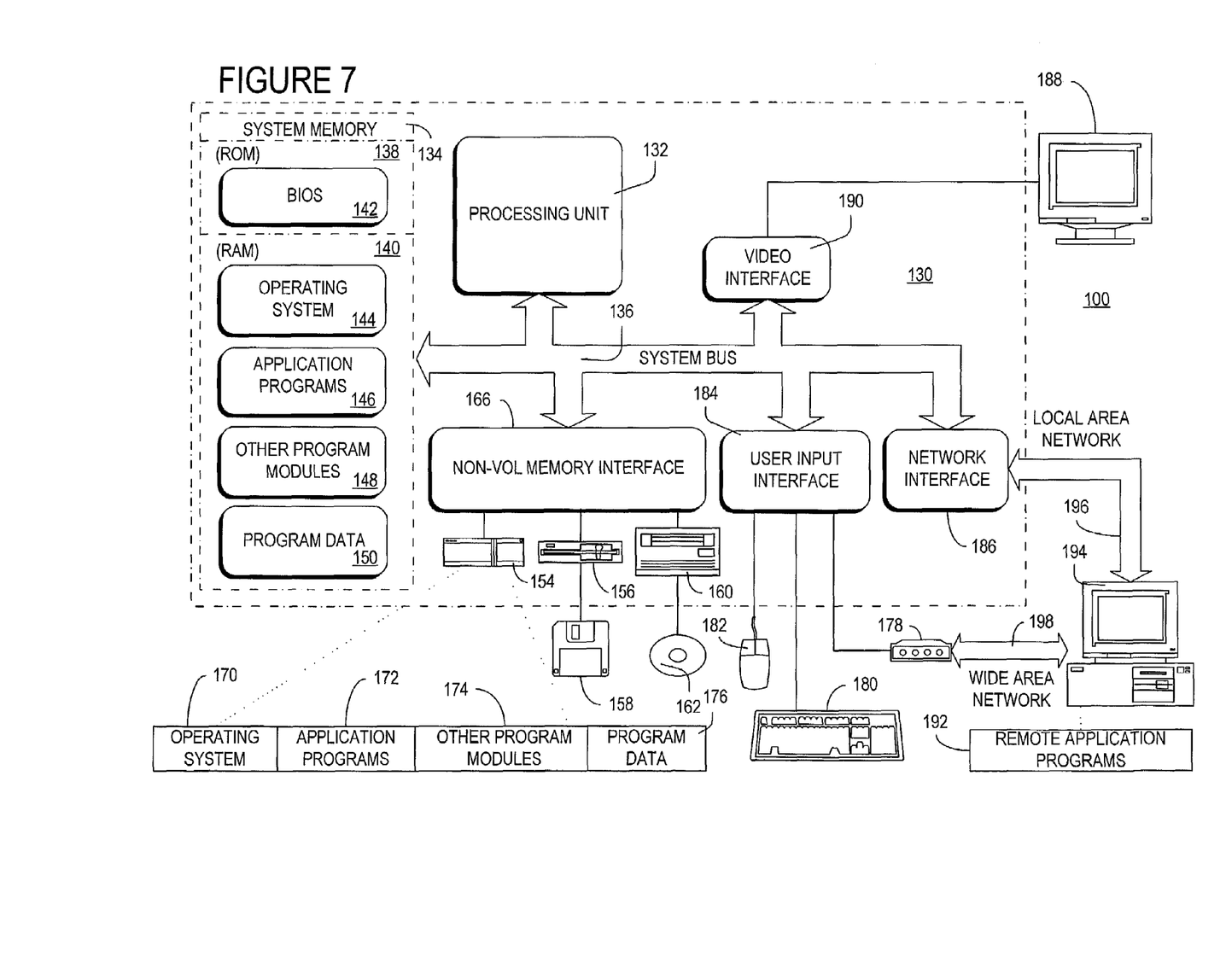
FIG. 7 is a block diagram illustrating one example of a suitable computing system environment in which the invention may be implemented.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices or any other medium that can be used to store the desired in information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infra-red, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example FIG. 7 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or write to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer-readable instructions, data structures, program modules and other data for the computer 130. In FIG. 7, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown).

By way of example, and not limitation, FIG. 8 illustrates remote application programs 192 as residing on the memory device. It will appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, the computer 102 such as computer 130 executes computer-executable instructions such as those illustrated in FIG. 4 to manipulate the target software 110 stored on the target computer-readable media 108 of the server 104.

The following examples illustrate the invention.

An exemplary software tool according to the invention such as software tool 606 allows OEMs to add mass storage device drivers to an offline image without rebooting the image or rebuilding the operating system. As a result, OEMs can reduce the number of images they maintain. The software tool 606 also increases the life span of the images because the images do not need to be rebuilt for new devices. In this example, the software tool 606 is a mass storage device installation tool (e.g., msdinst.exe). The software tool 606 allows OEMs to change existing offline images without booting into or recreating those images. The software tool 606 works with various offline images including, but not limited to, offline images that are accessible via a network such as network 106 and need new mass storage device drivers. For example, the software tool 606 can update drivers that already exist on the image. The software tool 606 also allows OEMs to update areas in the registry. In one embodiment, the software tool 606 executes in a minimal operating system environment.

The user creates a Sysprep.inf file with only the [SysprepMassStorage] section. In the [SysprepMassStorage] section, the user lists each new mass storage devices by a unique identifier (ID) that need to be added. The user accesses the software tool 606, for example, by installing the tool on a computer that is connected to a network such as network 106 and is running a minimal operating system. The user opens a command window and starts execution of the software tool 606 with command-line options. The command-line options include, but are not limited to, the path to the new Sysprep.inf file and the path to the directory that contains the image to be updated. For example, the following command may be used.

D:\i386\system32>msdinst.exe  A:\Sysprep.inf E:\Tools\Image1

In response to the command, the software tool 606 adds each ID from the new Sysprep.inf to a critical device database such as device database 608 enabling the mass storage device driver to boot the system. In addition, the software tool 606 installs the necessary driver files and configures those drivers to start as specified in the Sysprep.inf file. Further, the software tool 606 updates the Sysprepclean section with all the new and updated registry information. Also, the software tool 606 searches Sysprep.inf for driver files in the file system related to the drivers identified in Sysprep.inf. In particular, the software tool 606 searches the regular and compressed versions of the driver's .inf files in the same directory as originally specified in the new Sysprep.inf. For example, supermsd.sys may be the .inf file for one of the drivers. The software tool 606 looks for supermsd.sys first and also looks for any compressed versions of supermsd.sys if they exist. The software tool 606 also searches all the files in the offline image's driver.cab, all the files in the offline image's driver.cab present in the source media, and the offline image's sourcepath directory for the regular and compressed versions of each driver's .inf file.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A system for manipulation by a computer of target software stored on one or more target computer-readable storage media, said target software having an online state and an offline state, wherein said get software is in the online state when being executed and in the offline state when not being executed, said system comprising a driver executing on the computer to provide access to the target software by mounting the target computer-readable storage media on the computer, said driver comprising one or more redirect components for manipulating the target software when the target software is offline by receiving, from a user, at least one command having a storage location specified therein and modifying the specified storage location to redirect the command to operate on the target software stored on the target computer-readable storage media mounted on the computer.

2. The system of claim 1, wherein the target software comprises an operating system, and wherein the target software is online when operating system is executing.

3. The system of claim 1, wherein the target software comprises an application program, and wherein the target software is online when the application program is executing.

4. The system of claim 1, wherein the computer and the target software are connected to a data communication system, and wherein the driver executes on the computer to provide access to the target software via the data communication system.

5. The system of claim 1, further comprising a graphical user interface, wherein the command comprises input from the user via the graphical user interface.

6. The system claim 1, wherein the driver, responsive to user input, manipulates at least one system setting for the target software.

7. The system of claim 1, wherein the target software comprises at least one file, and wherein the driver, responsive to user input, manipulates the target software by modifying the file.

8. The system of claim 1, wherein the target computer-readable storage media comprise one or more files, wherein the driver modifies the files.

9. The system of claim 8, wherein the driver adds to or deletes from the files.

10. The system of claim 1, wherein the driver comprises computer-executable instructions for storing, in a queue accessible by the computer, a list of one or more tasks associated with execution of the command.

11. The system of claim 10, wherein the driver further comprises in computer-executable instructions for modifying the list of tasks stored in the queue to direct the tasks to operate on the target computer-readable storage media.

12. The system of claim 11, wherein the driver further comprises compute-executable instructions for committing the queue to perform each of the modified tasks.

13. The system of claim 11, wherein the computer-executable instructions for storing and modifying are executed when the target software is in the online state.

14. The system of claim 1, wherein the driver comprises a service component for adding a service to the target software by installing one or more files associated with the service to the target computer-readable storage media.

15. The system of claim 1, wherein the driver comprises a registry component for updating at least one system setting of the target software by modifying one or more files on the target computer-readable storage media.

16. The system of claim 1, wherein the driver comprises a file component for performing file input and file output operations on the target computer-readable storage media.

17. The system of claim 1, wherein the driver comprises a device component for adding at least one device driver to the target software by installing one or more files associated with the device driver to the target computer-readable storage media.

18. The system of claim 17, wherein the device driver is a mass storage device controller.

19. The system of claim 17, wherein the device component is associated with a hardware device.

20. A method for manipulation by a computer of target software stored on one or more target computer-readable storage media, said target software having an online state and an offline state, wherein said target software is in the online state when being executed and in the offline state when not being executed, said method comprising accessing the target computer-readable storage media when the target software is offline by: receiving, by a driver executing on the computer to provide access to the target software, at least one command from a user, said command having a storage location specified therein;
mounting, by the driver, the target computer-readable storage media on the computer;
modifying, by the driver, the specified storage location to redirect the command to operate on the target software stored on the target computer-readable storage media mounted on the computer.

21. The method of claim 20, wherein the target software comprises an operating system, and wherein said accessing comprises accessing the target computer-readable storage media when the operating system is not being executed.

22. The method of claim 20, wherein the target software comprises an application program, and wherein said accessing comprises accessing the target computer-readable storage media when the application program is not being executed.

23. The method of claim 20, wherein the computer and the target software are connected to a data communication system.

24. The method of claim 20, further comprising generating a list of one or more tasks associated with execution of the command.

25. The method of claim 24, further comprising storing the list of tasks in a queue accessible by the computer.

26. The method of claim 25, further comprising modifying the list of tasks stored in the queue to direct the tasks to operate on the target computer-readable storage media.

27. The method of claim 26, further comprising committing the queue to perform each of the modified tasks.

28. The method of claim 20, wherein the target computer-readable storage media comprise one or more files, and wherein accessing comprises modifying the files.

29. The method of claim 28, wherein in modifying comprises adding to or deleting from the files.

30. The method of claim 20, wherein accessing comprises manipulating at least one system setting for the target software.

31. The method of claim 20, further comprising identifying the target software from the command.

32. The method of claim 31, wherein the command comprises one or more command-line options, and wherein identifying comprises parsing the command-line options.

33. The method of claim 20, wherein one or more computer-readable storage media have computer-executable instructions for performing the method of claim 20.

34. A computer-readable storage medium having stored thereon a data structure representing a queue for use by a computer in manipulating target software stored on one or more target computer-readable storage media, said target software having an online state and an offline state, wherein said target software is in the online state when being executed and in the offline state when not being executed, said manipulating occurring when the target computer-readable storage media is mounted on the computer and the target software is in the offline state and responsive to at least one command received from a user, said data structure comprising a queue field storing a list of one or more tasks associated with execution of the command, each of said tasks having a storage location specified therein, wherein a driver executing on the computer to provide access to the target software modifies the storage locations specified in the list of tasks stored in the queue field to direct the tasks to operate on the target software stored on the target computer-readable storage media mounted on the computer.

35. The computer-readable storage medium of claim 34, wherein the target software comprises an operating system, and wherein the target software is online when the operating system is executing.

36. The computer-readable storage medium of claim 34, wherein the target software comprises an application program, and wherein the target software is online when the application program is executing.

37. The computer-readable storage medium of claim 34, wherein the computer and the target software are connected to a data communication system.

38. The computer-readable storage medium of claim 34, wherein the computer commits the queue to perform each of the modified tasks stored in the queue field.

* * * * *

UNITED STATES PATENT AND TRADEMARK OFFICE
CERTIFICATE OF CORRECTION

PATENT NO.        : 7,062,764 B2
APPLICATION NO. : 10/173216
DATED             : June 13, 2006
INVENTOR(S)      : Cohen et al.

It is certified that error appears in the above-identified patent and that said Letters Patent is hereby corrected as shown below:

On the face page, in field (56), under "U.S. Patent Documents", in column 2, line 21, after "6,532,474" delete "B1" and insert -- B2 --, therefor.

In column 8, line 22, delete "computer readable" and insert -- computer-readable --, therefor.

In column 8, line 22, delete "Computer readable" and insert -- Computer-readable --, therefor.

In column 8, line 26, delete "readable" and insert -- computer-readable --, therefor.

In column 8, line 30, delete "computer readable" and insert -- computer-readable --, therefor.

In column 8, line 36, after "devices" insert -- , --.

In column 8, line 37, after "desired" delete "in".

In column 8, line 39, delete "computer readable" and insert -- computer-readable --, therefor.

In column 8, line 50, delete "computer readable" and insert -- computer-readable --, therefor.

In column 8, line 67, after "example" insert -- , --.

In column 9, line 2, delete "FIG. 8" and insert -- FIG. 7 --, therefor.

In column 9, line 5, delete "write" and insert -- writes --, therefor.

In column 10, line 1, delete "FIG. 8" and insert -- FIG. 7 --, therefor.

In column 10, line 3, after "will" insert -- be --.

In column 12, line 8, in Claim 1, delete "get" and insert -- target --, therefor.

In column 12, line 23, in Claim 2, after "when" insert -- the --.

In column 12, line 36, in Claim 6, after "system" insert -- of --.

In column 12, line 53, in Claim 11, after "comprises" delete "in".

CERTIFICATE OF CORRECTION (continued)
U.S. Pat. No. 7,062,764 B2

In column 12, line 57, in Claim 12, delete "compute-executable" and insert -- computer-executable --, therefor.

In column 14, line 4, in Claim 29, after "wherein" delete "in".

Signed and Sealed this

Twentieth Day of April, 2010

David J. Kappos
*Director of the United States Patent and Trademark Office*